United States Patent Office 3,480,363
Patented Nov. 25, 1969

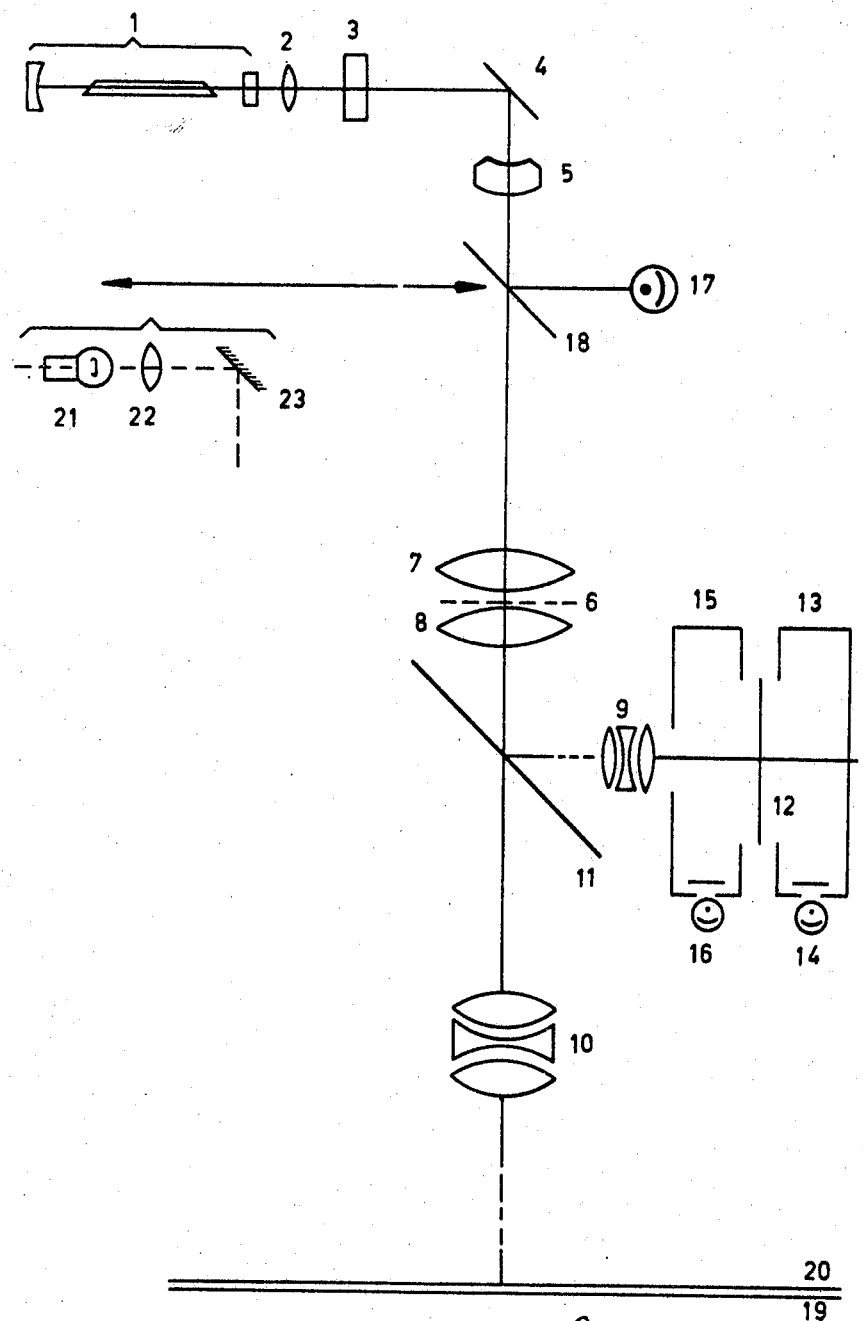

3,480,363
OPTICAL SCANNING SYSTEM
David J. Stewart, 52 Oaklands Drive,
Wokingham, Berkshire, England
Filed Dec. 5, 1966, Ser. No. 599,008
Claims priority, application Great Britain, Dec. 9, 1965,
52,419/65
Int. Cl. G03b 27/76
U.S. Cl. 355—68          5 Claims

ABSTRACT OF THE DISCLOSURE

An optical scanning and reproduction system using a laser radiation source and a reflecting surface rotatable about multiple axes to generate a light spot raster. A beam splitter directs the light beam to both a scanning plane and a reproduction plane. A first photo-electric radiation sensor, placed at the scanning plane, is responsive to modulated radiation resulting from scanning the "original," and directs a first signal to a photoreproduction computer. A second signal is derived from a second photoelectric radiation sensor in the path of a beam split from the main beam path. A beam modulating device is located in the main beam path and receives a signal from the photoreproduction computer derived from the first and second signals. The modulated beam is projected to the reproduction plane by a lens system.

---

This invention relates to optical systems for the purpose of scanning, that is of irradiating successively small areas of a plane object, for measuring the intensity of the reflected or transmitted radiation and for the subsequent optical re-creation of the radiance distribution, subject to magnification, and to reversal or other modification of gradation or of information content.

A particular purpose for this invention is the reproduction of photographic originals and their correction so as to be compatible with such processes as screening, that is conversion to a dot image structure for subsequent reproduction by printing processes.

The invention will be described with reference to an embodiment shown in the accompanying drawings the purpose of which is the reproduction of monochrome photographic originals with or without enlargement and reduction and subject to the conventional modification processes used in such reproduction. The devices used in this embodiment are those preferred at present, but it will be understood that alternative selection of component parts is not excluded.

Numeral 1 refers to a laser radiation source: in this embodiment being a continuous gas laser operated in the hemispherical cavity configuration and hence emitting a uniphase wavefront. This radiation is collimated by optical system 2 and traverses an intensity modulator 3. This modulator is capable of altering its effective light transmission factor in response to electrical signals in a manner well known in the art, and discussed, for example, in a paper by A. F. Harvey on "Electro-Optic Modulation at Microwave Frequencies" read at the conference on "Lasers and their Applications" at the Institution of Electrical Engineers, London, England, on Sept. 30, 1964.

The radiation then impinges upon a component 4, here shown as a plane face of a mirror. Means are provided for the rotation or oscillation of the mirror about an axis normal to the axis of the parallel radiation beam and to the axis of symmetry of the optical system 5, and also about an axis coincident with the direction of the radiation beam in the space 3 to 4.

Such a mirror system can, by varying the speed, and phase relationships, and the extents of angular sweeps, of the two movements, direct varying beam patterns on to the optical system 5. The pattern required in the plane scanned for the present purpose is one similar to the scanning raster of a cathode ray tube, consisting of a series of substantially parallel closely-spaced lines.

The purpose of the optical system 5 is to accept the two-dimensional angular array of parallel radiation beams generated by the previous components, and to bring each elementary beam to a focus in a plane surface 6, within the limits of the residual field curvature aberration of the system 5.

No device is known which will carry out this function but it has been found that the output half of that lens system known in the art as a double-Gauss process lens system, modified if necessary for the purpose in hand, is suited to this purpose. The input half of the double-Gauss, which is essentially a photographic tool, is designed to resolve a light beam diverging from a point source into a set of elementary collimated beams, while the output half is designed to focus the collimated beams on to a surface closely approximating a plane.

Thus the output halves of selected double-Gauss systems are suitable for the present purpose, and it is believed that the use of the output half of the double-Gauss by itself is novel. The earlier Gauss lens system, no longer in use, has a different configuration.

It may be desirable to augment this new tool with field flatness devices adjacent the focal plane in certain circumstances.

The double-Gauss system is described in "A System of Optical Design" by Arthur Cox, published in 1964 by Focal Press, at page 450.

The primary raster scan is formed in plane 6. A condenser system, shown in this instance as two lenses 7 and 8 is associated with the plane 6, and has as its purpose the imaging of the exit pupil of system 5 into the entrance pupil of highly corrected lens system 9 and 10 via a beam splitter 11.

Considering radiation reflected by 11, this is focused by system 9 and forms an image of the primary scan 6 in the plane 12 in which is situated the original to be reproduced.

In the case of a transparent original, the transmitted radiation is diffusely reflected within the integrating cavity 13 behind plane 12 and is detected by a photocell 14. The integrating cavity 15 in front of plane 12 and its associated photocell 16 operate in the case of an opaque original.

Either or both cavities may be provided. As alternatives to integrating cavities, the following systems may be used: for transparencies of moderate size, a condenser collection system; for large transparencies and for opacities of any size, systems comprising collection optics, diffusing components, a photocell, and optical means for compensating for the non-uniformity of collection efficiency, especially near the edges of the scanned area.

In order that the reflection, or transmission, factor of the irradiated area of the original shall be determined, it is necessary to measure the incident radiant energy, which is continually being changed by the modulator 3 as and for the reasons described below. For this purpose, a beam splitter 18 between system 5 and plane 6 reflects a proportion of the incident energy on to a photocell 17.

It will be appreciated that the beam incident upon modulator 3 has a diameter of no more than about 1.00 cm. and is constant in direction. Some electro-optic modulators, as known today, will cover such an area, but little more. It will be appreciated that the area of the reproduction surface to be scanned can be of the order of a thousand square centimeters and more, and consequently the solid angular envelope containing the scanning beam is large.

It will be impracticable with present forms of modulator to insert the modulator in the most convenient and logical position between the lens system 10 and the reproduction means 19, 20. Instead, the modulator 3 must be in the position shown. This means that the beam used for scanning the original is of varying intensity, and the output of the detectors 14, 16 must be related to a beam intensity factor.

The output signals of the operative photocells 17, and 14 or 16, are amplified, and applied to a computer (not shown) comprising circuits well-known in the art for preforming any or all of the functions of contrast alterations, tonal correction, unsharp maskinng, and the like. The computer output is applied to modulator 3, in such a way as to create in the plane 6 the spatial intensity distribution required for the particular piece of photographic reproduction in hand.

This reconstruction is imaged by system 10 into a plane 19 in which is situated the sensitive material to be exposed. In the case of screened reproduction, a contrast screen 20 is situated in the position shown.

To assist in initial adjustment of the equipment, a continuous light soruce 21, lens system 22, and movable mirror 23 are provided. With their aid, reference marks in the plane 6, which delineate the axial position of 6 and the linear extent of the primary scan, may be imaged in correct focus and at the desired magnification in the plane of original and copy.

The intermediate scanning raster at 6 could be of the order of 12 cms. square. Both the lens systems 9, 10 can be adjustable or replaceable so as to cater both for negative and positive raster magnification.

The range of sizes of original catered for can be, for example, 2.5 x 3.75 cms. to 50 x 24 cms., while the range of sizes of reproduction catered for can be from 12 cms. square to 50 x 24 cms.

For example, the lens system 9 can be adjusted between 3:1 reduction and 4:1 magnification, while the system 10 can be adjusted between 1:1 and 4 or 5:1 magnification.

Of course, the condenser lens system 7, 8 must be adjusted to be compatible with the lens systems 9, 10 as far as possible, but it will be seen that if both lens systems 9, 10 are variable and are at opposite extremes, the condenser adjustment must be a comprise. In such circumstances it is better to replace the single condenser system 7, 8 by two condenser systems; one in the reflection path between beam-splitter 11 and lens system 9, and the other in the transmission path between beam-splitter and lens system 10; the beam-splitter 11 and the two lens systems being positioned so that two intermediate scan planes are formed, each corresponding to plane 6 in the drawing. Each condenser system can now be selected and adjusted to be exactly compatible with its own lens system.

What is claimed is:

1. Optical "picture" scanning and reproduction system comprising, means for generating a uniphase, coherent collimated radiation beam, means for deflecting and focussing said beam to create on an intermediate substantially planar area in space a light spot raster; means for splitting into discrete paths the radiation emanating from said planar area for transmission to scanning plane and a reproduction plane in said discrete paths; a first photoelectric radiation sensor responsive to the modulated radiation resulting from scanning an "original" at the scanning plane with a swept raster beam; beam-splitting means in the collimated beam path and a second photoelectric device in the path of the beam split from the main beam path; a means defining incoming signal paths from the outputs of the said first photoelectric device and of said second photoelectric device to a photoreproduction computer; a beam modulating device in the beam path; and means defining an outgoing signal path for applying from said computer to said beam modulating device modulation signals derived from the signals received from said first photoelectric device and said second photoelectric device.

2. Optical "picture" scanning system as claimed in claim 1, comprising an enlargement or reduction lens system in at least one of the following: the light beam path individual to the scanning plane, and the light beam path individual to the reproduction plane.

3. Optical "picture" scanning system as claimed in claim 2 comprising both said lens systems, and an adjustable condenser system associated with each of said lens system.

4. System as claimed in claim 1, wherein said light beam source is a continuous gas laser and said beam deflection means comprises a plane mirror mounted for and provided with means for deflection about two orthogonal axes an output half of a double Gauss process lens focussing the parallel beams impinging thereon in various directions on to respective points on a scanning plane.

5. Optical "picture" scanning system as claimed in claim 1, wherein said scanning plane is associated with at least one of the following: a front integrating cavity and detector for an opaque original; a rear integrating cavity and detector for a transparent original; a condenser collection system and detector; and a system comprising collection optical means, diffusion components and detector.

References Cited

UNITED STATES PATENTS 3,183,766  5/1965  Takasaka et al.

NORTON ANSHER, Primary Examiner

W. A. SIVERTSON, Assistant Examiner

U.S. Cl. X.R.

355—71, 75